United States Patent [19]

Shaver

[11] Patent Number: 4,719,982

[45] Date of Patent: Jan. 19, 1988

[54] APPARATUS FOR CONVERTING A ROAD VEHICLE INTO A SNOWMOBILE

[76] Inventor: Allen L. Shaver, General Delivery, Stonewall, Manitoba, Canada, R0C 2Z0

[21] Appl. No.: 927,713

[22] Filed: Nov. 7, 1986

[51] Int. Cl.$^4$ .................................................. B62B 19/00
[52] U.S. Cl. .................................. 180/183; 180/9.21; 180/9.26; 180/185
[58] Field of Search ............... 180/183, 184, 185, 182, 180/9.21, 9.26, 190

[56] References Cited

U.S. PATENT DOCUMENTS

| | | | |
|---|---|---|---|
| 1,292,427 | 1/1919 | Brekken | 180/185 |
| 1,545,264 | 7/1925 | Logan | 180/185 |
| 1,663,948 | 3/1928 | LaPorte | 180/185 |
| 1,937,923 | 12/1933 | Taylor | 180/183 |
| 3,710,886 | 1/1973 | Wagner | 180/9.21 |
| 3,737,001 | 6/1973 | Rasenberger | 180/185 |
| 3,845,967 | 11/1974 | O'Brien et al. | 180/185 |
| 3,901,525 | 8/1975 | O'Brien | 280/14 |
| 4,069,883 | 1/1978 | Cousineau | 180/9.21 |
| 4,204,582 | 5/1980 | Van Soest | 180/183 |
| 4,313,516 | 2/1982 | Terry | 180/185 |

FOREIGN PATENT DOCUMENTS 1109510 8/1922 Canada .

Primary Examiner—James T. McCall
Attorney, Agent, or Firm—Adrian D. Battison; Stanley G. Ade; Murray Thrift

[57] ABSTRACT

A conversion arrangement for converting a conventional rear wheel drive road vehicle to a snowmobile comprises a subframe upon the sides of which are mounted track support wheels and tracks with the subframe attached to the vehicle through the conventional rear suspension springs. At the front end of the subframe is a pair of forwardly extending levers which are attached to the front wheel hubs of the vehicle and carry skis. The skis are vertically movable under control of the vehicle front suspension by pivotal movement about a shaft at the front edge of the subframe with the amount of movement limited by the addition of an arcuate stop arrangement which cooperates with a tongue extension on the lever system. The rear drive axle of the vehicle is moved from its conventional position on the springs rearwardly to a position at a rearmost edge of the subframe with an additional drive shaft added between the vehicle drive shaft and the vehicle back axle for communication of drive. Thus track engaging wheels can be mounted directly beneath the rear springs of the vehicle to provide additional ground support.

11 Claims, 5 Drawing Figures

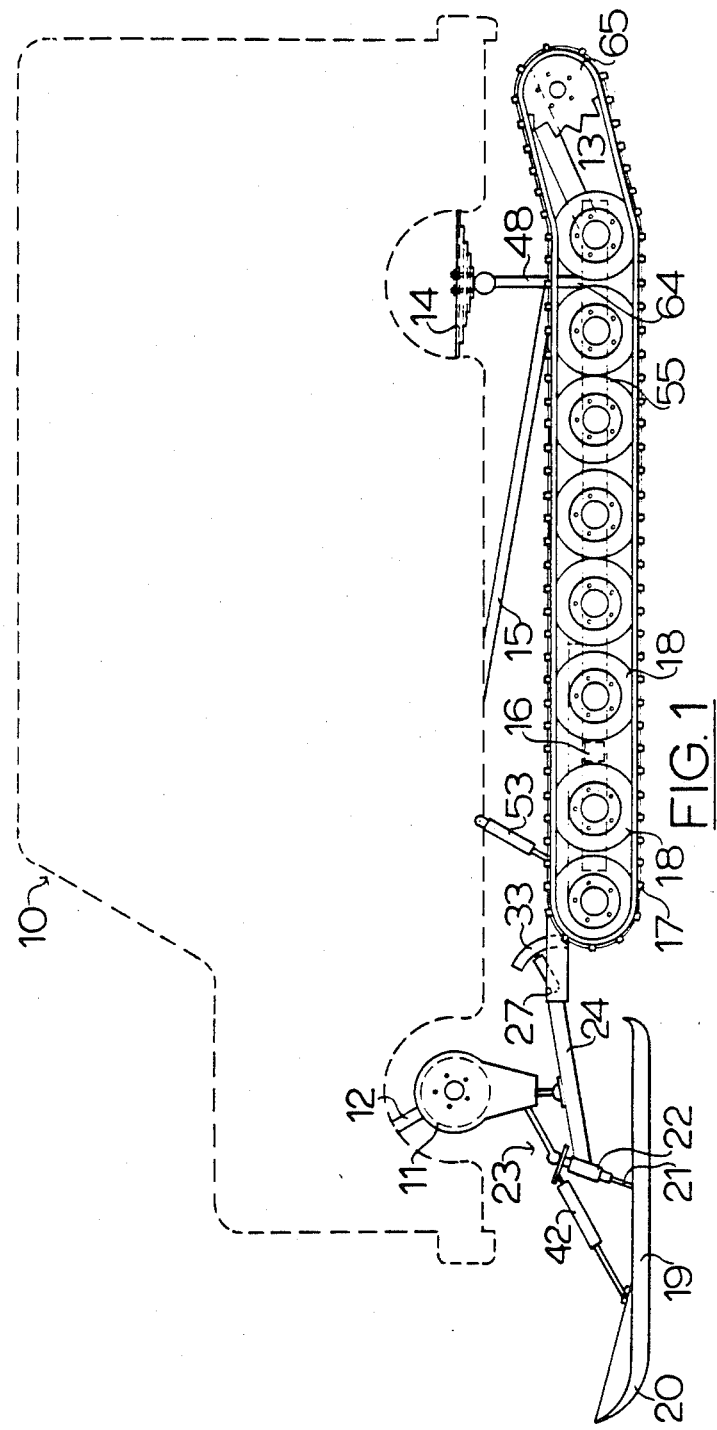

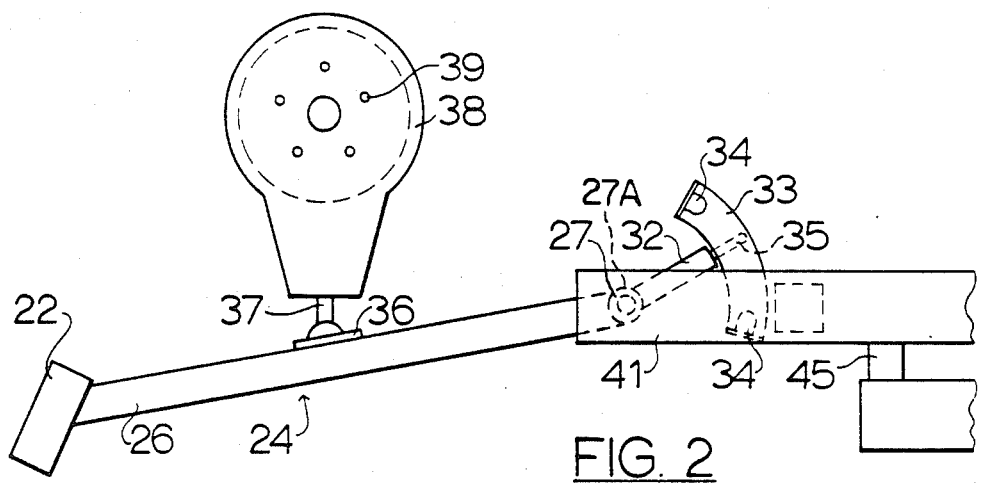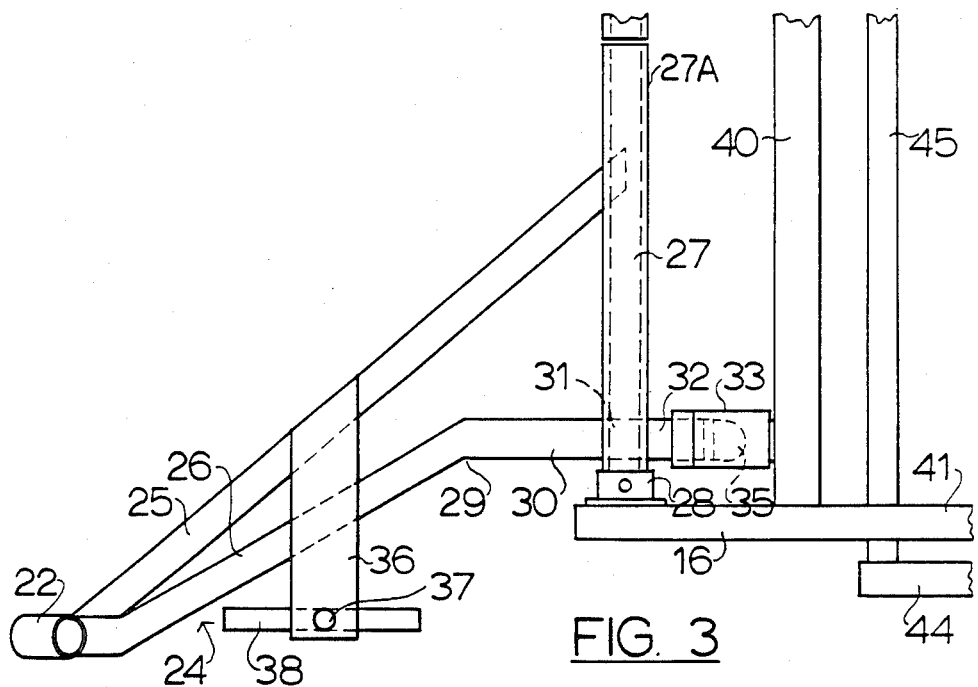

APPARATUS FOR CONVERTING A ROAD VEHICLE INTO A SNOWMOBILE

BACKGROUND OF THE INVENTION

This invention relates to an apparatus for converting a road vehicle into a snowmobile. One example of a device of this type is shown in my prior Canadian Pat. No. 1,109,510 issued on Sept. 22, 1981. This conversion device has been successful and enables the simple conversion of a normal road vehicle for example a van from road travel to snow travel.

The vehicle employs in its converted form a rectangular subframe which is attached beneath the vehicle with a rear end of the subframe attached directly beneath the rear road springs and including a pair of skis supported for pivotal movement about a horizontal axis at a front edge of the subframe. This provides rapid, smooth movement of the vehicle over snow covered land and enables the production of a snow vehicle at a fraction of the cost of a custom built device of this type.

There remains however opportunity for improvement of the device in a number of areas and it is one object of the present invention, therefore, to provide a device of this general type which is improved relative to the device shown in my above Canadian patent.

SUMMARY OF THE INVENTION

According to a first aspect of the invention, therefore, there is provided apparatus for converting into a snowmobile a road vehicle of the type including a vehicle body, a pair of front ground wheel attachment hubs, a pair of rear ground wheel attachment hubs, front suspension spring means for mounting said front wheel hubs on said vehicle body for a suspension movement, rear suspension spring means for mounting said rear wheel hubs on said vehicle body for a suspension movement, rear suspension spring means for mounting said rear wheel hubs on said vehicle body for a suspension movement, and a drive shaft for communicating drive from a vehicle engine to said rear wheel hubs, said apparatus comprising a substantially rectangular subframe, two series of track engaging idler wheels arranged along respective sides of said subframe, an endless ground engaging track extending around each series of track engaging wheels, means for attachment of said frame to said rear suspension spring means, a pair of ground engaging steering members, strut means mounting each of said steering members on said subframe, said strut means extending forwardly from a front edge of said subframe and being pivotal about a substantially horizontal axis relative to said subframe, means for attaching each of said strut means to respective one of said front hubs such that said front suspension spring means applies spring force to said strut means in pivotal movement thereof, and limit means coupled between said subframe and said strut means for limiting the pivotal movement of the strut means relative to said subframe.

Such a device, therefore, is improved by the fact that the pivotal movement between the steering member, which may be an all terrain wheel or a ski, and the front edge of the subframe is limited to a required degree to prevent the skis from engaging the lower end of the vehicle during suspension movements thereof. It will be appreciated that the normal vehicle suspension is a very effective way of providing a highly effective suspension system for the snowmobile conversion but this requires modification so that the suspension can accommodate the different movement characteristics required for the snowmobile suspension.

According to a second aspect of the invention, there is provided apparatus for converting into a snowmobile a road vehicle of the type including a road vehicle of the type including a vehicle body, a pair of front ground wheel attachment hubs, a pair of rear ground wheel attachment hubs, front suspension spring means for mounting said front wheel hubs on said vehicle body for a suspension movement, rear suspension spring means for mounting said rear wheel hubs on said vehicle body for a suspension movement, and a drive shaft for communicating drive from a vehicle engine to said rear wheel hubs, said apparatus comprising a substantially rectangular subframe, two series of track engaging idler wheels arranged along respective sides of said subframe, an endless ground engaging track extending around each series of track engaging wheels, means for attachment of said frame to said rear suspension spring means, a pair of ground engaging steering members, strut means mounting each of said steering members on said subframe, said strut means extending forwardly from a front edge of said subframe and being pivotal about a substantially horizontal axis relative to said subframe, means for attaching each of said strut means to respective one of said front hubs such that said front suspension spring means applies spring force to said strut means in pivotal movement thereof, drive means for said tracks comprising a pair of drive wheels each cooperating with a respective one of the tracks, said drive wheels being mounted on respective ends of a drive axle, said drive shaft means of said vehicle being arranged to drive said drive axle, rear strut means interconnecting said subframe and said rear suspension spring means and arranged to overlie rearward ones of said idler wheels, said drive wheels and drive axle being arranged rearwardly of said rear suspension spring means and subsidiary drive shaft means for communicating drive from said drive shaft to said drive axle.

Such a device is therefore improved by the positioning of the drive axle for the snowmobile conversion rearwardly of its normal position on the vehicle. This enables a larger number of track support wheels to be positioned along the sides of the subframe beneath the vehicle to provide a greater load carrying capacity. The normal vehicle back axle is then moved rearwardly from its normal suspension position and a subsidiary drive shaft communicates drive from the normal vehicle drive shaft to the normal back axle for driving the tracks.

According to a third aspect of the invention, there is provided an apparatus for converting into a snowmobile a road vehicle of the type including a vehicle body, a pair of front ground wheel attachment hubs, a pair of rear ground wheel attachment hubs, front suspension spring means for mounting said front wheel hubs on said vehicle body for a suspension movement, rear suspension spring means for mounting said rear wheel hubs on said vehicle body for a suspension movement, and a drive shaft for communicating drive from a vehicle engine to said rear wheel hubs, said apparatus comprising a substantially rectangular subframe, two series of track engaging idler wheels arranged along respective sides of said subframe, an endless ground engaging track extending around each series of track engaging wheels, means for attachment of said frame to said rear suspension spring means, a pair of ground engaging steering members, strut means mounting each of said steering members on said subframe, said strut means extending forwardly from a front edge of said subframe and being pivotal about a substantially horizontal axis relative to said subframe, means for attaching each of said strut means to respective one of said front hubs such that said front suspension spring means applies spring force to said strut means in pivotal movement thereof, drive means for said tracks comprising a pair of drive wheels each cooperating with a respective one of the tracks, said drive wheels being mounted on respective ends of a drive axle, said drive shaft means of said vehicle being arranged to drive said drive axle, a pair of rear strut means each directly connected to said subframe and, a shaft interconnecting said strut means and a pair of bearing means mounted on said shaft, each including means for attachment of said bearing means to a respective one of said rear suspension spring means whereby said shaft and said subframe can pivot relative to said spring means about an axis of the shaft.

With the forgoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a side elevational view of a vehicle including a snowmobile conversion according to the invention.

FIG. 2 is a side elevational view of the front strut means for supporting the skis on an increased scale.

FIG. 3 is a top plan view of the strut means of FIG. 2.

In the drawings like characters of reference indicate corresponding parts in the different figures.

DETAILED DESCRIPTION

Figure 4:
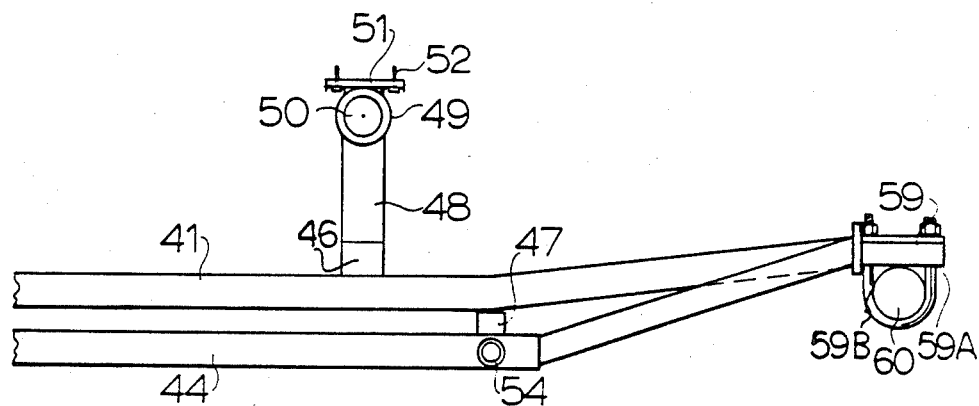
FIG. 4 is a side elevational view on an increased scale of a rear end of the subframe for attachment to the rear suspension springs and for receiving the rear drive axle.

Reference is firstly made to my Canadian Pat. No. 1,109,510 which describes in detail a snowmobile conversion arrangement of the general type with which the present invention is concerned. For a full understanding of the present invention, therefore, reference should be made to that prior patent the disclosure of which is incorporated herein by reference.

Turning now, therefore, to FIG. 1 of the present application, there is shown a van body generally indicated at 10 which is of conventional construction and includes a front wheel hub 11, front suspension schematically indicated at 12, a rear drive axle 13 and rear spring 14. In addition the vehicle includes a conventional drive shaft 15 for communicating drive in the normal road condition of the vehicle from the transmission (not shown) to the rear axle 13.

The conversion device for converting the vehicle 10 into a snowmobile comprises a generally rectangular subframe 16 which supports tracks 17 along the respective sides thereof on track engaging wheels 18. In addition, the device comprises a pair of front skis 19 only one of which is visible in the drawings but it will be apparent that a second ski is arranged on the opposed side of the vehicle not visible in FIG. 1. The ski is of generally conventional construction including an upturned front nose 20 and is attached to a generally upright shank 21 which is mounted within a steering sleeve 22 so that the ski can be steered in left and right direction as required to steer the vehicle by a suitable linkage generally indicated at 23. The linkage is attached to the steering mechanism of the vehicle so that it can be actuated by the normal steering system.

In an alternative arrangement (not shown) the skis may be replaced by an all terrain wheel type device.

The steering sleeve 22 is attached to the front end of a lever system 24 shown schematically in FIG. 1 and in more detail in FIGS. 2 and 3. The lever system comprises a pair of levers 25, 26 which extend upwardly and rearwardly from the sleeve 22 to a pivot transverse sleeve 27A mounted on a shaft 27 extending transversely of the vehicle and mounted on the front edge of the subframe 16. The sleeve 27A is rotatable on the shaft 27 which in turn is carried on shaft supports 28 on the subframe. Each of the levers 25, 26 is welded to the sleeve 27A with one of the levers 25 extending straight to its coupling point with the sleeve 27A while the other lever 26 is cranked at 29 so that a rearward portion 30 thereof extends directly rearwardly to its coupling with the sleeve 27A as indicated at 31.

The portion 30 is directly attached to a rearwardly extending strut 32 which extends beyond the coupling 31 and is directly pivotal with the portion 30 around the shaft 27. An arcate control sector 33 surrounds the end of the strut 32 remote from the coupling 31 and includes a pair of resilient stops 34 mounted at angularly spaced positions within the arcate sector for engaging a tongue 35. The engagement between the tongue 35 and the stops 34 therefore limits the angular movement of the lever system 24 so as to control the amount of lifting and lowering of the lever system 24 and therefore the ski 19.

The lever system 24 carries a transverse support plate 36 upon which is mounted a pivot coupling 37 which receives a lower end of a vertical attachment plate 38 arranged for attachment to the conventional wheel hub 11 of the vehicle. For this purpose the plate 38 includes a plurality of holes 39 for receiving the wheel bolts of the hub 11. Vertical pivotal movement of the lever 24 and therefore the ski 19 is communicated to the vehicle front suspension 12 through the plate 38 and the hub 11 so that the amount of movement is controlled by the arcate sector 33 while the suspension 12 provides a spring bias force for retaining the ski at a desired height relative to the vehicle body but to accommodate pivotal movement thereof caused by the uneven terrain.

The arcate sector 33 is attached to a transverse frame member 40 of the subframe 16 which interconnects side struts 41 only one of which is visible in FIGS. 2 and 3. Thus the sector 33 is retained rigid relative to the subframe 16 so that the degree of movement of the ski 19 is controlled relative to the subframe 16 and thus to the track 17.

As shown in FIG. 3, the levers 25 and 26 are mounted inboard of the frame side 16 but in an alternative arrangement (not shown) they can be outboard.

In order to limit pivotal movement of the ski relative to the shank 21 about a horizontal transverse axis, a shock absorber 42 is mounted respectively on the ski 19 and on the sleeve 22 so that it is at maximum extension as shown in FIG. 1. Thus the position of the ski relative to the subframe 16 is properly controlled by the cooperation of the stops shock absorber 42, the sector 33 and the tongue 35 and also by the suspension 12 of the vehicle.

Figure 5:
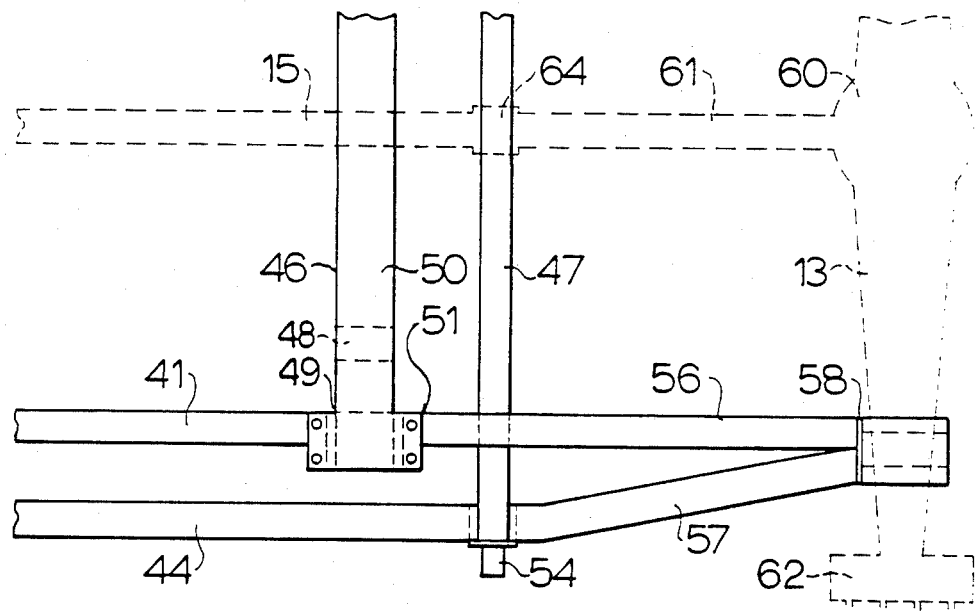
FIG. 5 is a top plan view of the portion of the subframe shown in FIG. 4, with the drive shaft, differential and rear axle of the vehicle being shown in phantom.

The subframe 16 comprises the side struts 41 visible in FIG. 2, 3, 4 and 5. In addition the subframe includes outer side struts 44 which extend parallel to the side struts 41 but at a position outwardly thereof and downwardly thereof so as to provide a rigid structure interconnected by transverse members 40, 45, 46 and 47 with interconnection between the upper and lower frame portions defined by the upper and lower sides 41 and 44.

At the rear of the sides 41, the transverse member 46 interconnects the sides and provides a connection for upstanding vertical struts 48 which are arranged for attachment of the subframe to the vehicle suspension. Thus there are two such vertical struts 48 arranged on opposed sides of the subframe and each is attached at an upper end thereof to a transverse shaft 50 extending across the full width of the vehicle. The transverse shaft 50 carries a pair of bearing collars 49 each of which is attached to a respective one of a pair of plates 51 which can be bolted by couplings 52 to the rear suspension springs 14. Thus the subframe 16 is coupled to the vehicle suspension for vertical movement of the struts 48 relative to the vehicle on the springs 14 and also for pivotal movement of the subframe 16 about an axis of the shaft 50. In order to control the amount of pivotal movement of the subframe about the shaft 50, a shock absorbing link 53 is positioned between the front transfer member 45 and the vehicle body so that the front end of the subframe is normally held spaced from the vehicle by the shock absorbing link 53.

The track engaging wheels 18 are mounted exterially of the outside sides 44 on pins 54 which extend outwardly from the sides. The pins support an elongate wheel support bar 55 upon which the wheels are carried. In the embodiment illustrated in FIG. 1 there are provided eight such wheels arranged from the front end of the subframe 16 with the rearmost wheel arranged rearwardly of the vertical struts 48. Thus the weight of the vehicle communicated through the struts 48 into the subframe is properly carried by wheels both forwardly and rearwardly of the strut 48 communicated through the wheels to the track and thence to the ground.

Rearwardly of the rearmost wheel 18, the sides 41 and 44 include slightly upwardly and rearwardly extending extension pieces 56 and 57 which converge to a transverse plate 58 and to a rearwardly extending plate 59 attached to the plate 58 and extending horizontally therefrom. The plates 59, one on each side of the subframe 16, are arranged to receive the rear axle 13 of the vehicle which, in the conversion process is moved from its normal condition attached to the springs 14 to a fresh position attached to the rearmost edge of the subframe 16. For this purpose, each plate 59 carries a spacer 59A to simulate the thickness of the rear spring and is attached to the rear axle by the existing U-bolt 59B. The rear axle 13 retains the differential 60 which is conventionally part of the back axle so that drive communicated to the differential by an additional drive shaft 61 causes drive to be communicated to the back axle and thence to the conventional wheel hubs 62. The additional drive shaft 61 connects through a universal joint 64 to the conventional drive shaft 15 of the vehicle. Thus in view of the movement of the rear axle rearwardly from its conventional position, the extra drive shaft 61 is necessary to complete the communication from the conventional vehicle drive shaft through to the back axle 13. Upon the rear wheel hubs 62 is mounted one of a pair of toothed drive wheels 65 for communicating drive from the hub 62 to the tracks 17.

In a further alternative arrangement (not shown) the rear axle 60 is mounted directly below the shaft 50 and therefore the rear most wheels 55 are forward of the rear springs 14.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Apparatus for converting into a snowmobile a road vehicle of the type including a vehicle body, a pair of front ground wheel attachment hubs, a pair of rear ground wheel attachment hubs, front suspension spring means for mounting said front wheel hubs on said vehicle body for a suspension movement, rear suspension spring means for mounting said rear wheel hubs on said vehicle body for a suspension movement, and a drive shaft for communicating drive from a vehicle engine to said rear wheel hubs, said apparatus comprising a substantially rectangular subframe, two series of track engaging idler wheels arranged along respective sides of said subframe, an endless ground engaging track extending around each series of track engaging wheels, means for attachment of said frame to said rear suspension spring means, a pair of ground engaging steering members, strut means mounting each of said steering members on said subframe, said strut means extending forwardly from a front edge of said subframe and being pivotal about a substantially horizontal axis relative to said subframe, means for attaching each of said strut means to respective one of said front hubs such that said front suspension spring means applies spring force to said strut means in pivotal movement thereof, and limit means coupled between said subframe and said strut means for limiting the pivotal movement of the strut means relative to said subframe wherein said limit means comprises an extension portion of said strut extending beyond said pivot axis and a pair of stop members arranged on opposed sides of said extension portion for limiting movement of said extension portion about said pivot axis.

2. The invention according to claim 1 including steering linkage means for communicating steering movement of said front wheel hubs to said steering members, said strut means including pivotal support means for said steering member for allowing said steering movement of said steering member relative to said strut means.

3. The invention according to claim 1 including means for coupling a front end of said subframe to said vehicle body.

4. The invention according to claim 1 wherein said subframe extends from a position just rearward of said front suspension spring means to a position rearward of said rear suspension spring means and includes a plurality of said track engaging wheels extending substantially along the full length of the sides thereof.

5. The invention according to claim 4 wherein said pivot axis is arranged immediately at a front edge of said subframe and wherein said hub engaging means is arranged between said pivot axis and the end of the strut adjacent the steering member.

6. The invention according to claim 1 including drive means for said tracks comprising a pair of drive wheels each cooperating with a respective one of the tracks, said drive wheels being mounted on respective ends of a drive axle, said drive shaft means of said vehicle being arranged to drive said drive axle, rear strut means interconnecting said subframe and said rear suspension spring means and arranged to overlie rearward ones of said idler wheels, said drive wheels and drive axle being arranged rearwardly of said rear suspension spring means and subsidiary drive shaft means for communicating drive from said drive shaft to said drive axle.

7. Apparatus for converting into a snowmobile a road vehicle of the type including a vehicle body, a pair of front ground wheel attachment hubs, a pair of rear ground wheel attachment hubs, front suspension spring means for mounting said front wheel hubs on said vehicle body for a suspension movement, rear suspension spring means for mounting said rear wheel hubs on said vehicle body for a suspension movement, and a drive shaft for communicating drive from a vehicle engine to said rear wheel hubs, said apparatus comprising a substantially rectangular subframe, two series of track engaging idler wheels arranged along respective sides of said subframe, an endless ground engaging track extending around each series of track engaging wheels, means for attachment of said frame to said rear suspension spring means, a pair of ground engaging steering members, strut means mounting each of said steering members on said subframe, said strut means extending forwardly from a front edge of said subframe and being pivotal about a substantially horizontal axis relative to said subframe, means for attaching each of said strut means to respective one of said front hubs such that said front suspension spring means applies spring force to said strut means in pivotal movement thereof, drive means for said tracks comprising a pair of drive wheels each cooperating with a respective one of the tracks, said drive wheels being mounted on respective ends of a drive axle, said drive shaft means of said vehicle being arranged to drive said drive axle, rear strut means interconnecting said subframe and said rear suspension spring means and arranged to overly rearward ones of said idler wheels, said drive wheels and drive axle being arranged rearwardly of said rear suspension spring means and subsidiary drive shaft means for communicating drive from said drive shaft to said drive axle.

8. The invention according to claim 7 wherein said drive axle comprises the vehicle axle removed from the vehicle and moved rearwardly on said subframe to a position rearward of its normal position on the vehicle and rearward of said rear suspension spring means.

9. Apparatus for converting into a snowmobile a road vehicle of the type including a vehicle body, a pair of front ground wheel attachment hubs, a pair of rear ground wheel attachment hubs, front suspension spring means for mounting said front wheel hubs on said vehicle body for a suspension movement, rear suspension spring means for mounting said rear wheel hubs on said vehicle body for a suspension movement, and a drive shaft for communicating drive from a vehicle engine to said rear wheel hubs, said apparatus comprising a substantially rectangular subframe, two series of track engaging idler wheels arranged along respective sides of said subframe, an endless ground engaging track extending around each series of track engaging wheels, means for attachment of said frame to said rear suspension spring means, a pair of ground engaging steering members, strut means mounting each of said steering members on said subframe, said strut means extending forwardly from a front edge of said subframe and being pivotal about a substantially horizontal axis relative to said subframe, means for attaching each of said strut means to respective one of said front hubs such that said front suspension spring means applies spring force to said strut means in pivotal movement thereof, drive means for said tracks comprising a pair of drive wheels each cooperating with a respective one of the tracks, said drive wheels being mounted on respective ends of a drive axle, said drive shaft means of said vehicle being arranged to drive said drive axle, a pair of rear strut means each directly connected to said subframe and, a shaft interconnecting said strut means and a pair of bearing means mounted on said shaft, each including means for attachment of said bearing means to a respective one of said rear suspension spring means whereby said shaft and said subframe can pivot relative to said spring means about an axis of the shaft.

10. The invention according to claim 9 wherein said drive wheels and said drive axle are mounted rearwardly of said rear suspension spring means and wherein there is provided a subsidiary drive shaft means for communicating drive from said drive shaft to said drive axle.

11. The invention according to claim 10 wherein said drive axle comprises the vehicle axle removed from the vehicle and moved rearwardly on said subframe to a position rearward of its normal position on the vehicle and rearward of said rear suspension spring means.

* * * * *